(12) United States Patent
Anand et al.

(10) Patent No.: US 6,303,092 B1
(45) Date of Patent: Oct. 16, 2001

(54) PROCESS FOR OPERATING EQUILIBRIUM CONTROLLED REACTIONS

(75) Inventors: Madhu Anand, Allentown; Shivaji Sircar, Wescosville; Brian Thomas Carvill, Orefield, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 08/419,317

(22) Filed: Apr. 10, 1995

(51) Int. Cl.$^7$ ..................................................... C01B 31/18
(52) U.S. Cl. .......................................... 423/418.2; 423/651
(58) Field of Search .................................... 423/659, 651, 423/652, 653, 654, 418.2, 437, 655, 656; 95/97

(56) References Cited

U.S. PATENT DOCUMENTS

| | | | |
|---|---|---|---|
| 4,491,573 | * | 1/1985 | Stönner et al. ...................... 423/656 |
| 4,906,448 | * | 3/1990 | Sauvion ............................... 423/656 |
| 5,256,172 | * | 10/1993 | Keetes ................................. 423/220 |
| 5,449,696 | * | 9/1995 | Dandekar et al. ................... 518/706 |

FOREIGN PATENT DOCUMENTS 58-49436 * 3/1983 (JP) ........................................ 95/140

OTHER PUBLICATIONS

Vaporciyan et al. (Alche Journal, vol. 33 #8 Aug. 1987).*
Westerterp et al. "Hydrocarbon Processing" p. 69 Nov. 1988.*
J. Berty et al. Chemtech p. 624 Oct. 1990.*
Kikuchi et al. Stud. Surf. Sci. Catal., 61 509 (1991)—"Natural Gas Conservation" No Month.*
Kirkby et al. 1991 Icheme Research Event (No Month).*
Goto et al Chemical Engineering Essays, 19 #6 (1993) No Month.*
Vaporciyan and Kadlec (AlChE Journal, vol. 33, No. 8, Aug. 1987).
Westerterp and coworkers (Hydrocarbon Processing) p. 69 (Nov. 1988).
J. Berty and coworkers (Chemtech, p. 624, Oct. 1990).
E. Kikuchi and coworkers (Stud. Surf. Sci. Catal., 61 (Nat. Gas Convers.), 509 (1991), No Month.
Kirkby and Morgen (The 1991 Icheme Research Event), No Month.
Goto and coworkers (Chemical Engineering Essays, vol. 19, No. 6 (1993)), No Month.

* cited by examiner

*Primary Examiner*—Stuart L. Hendrickson
(74) *Attorney, Agent, or Firm*—Keith D. Gourley

(57) ABSTRACT

The present invention is a process for operating equilibrium controlled reactions in continuous mode wherein a feedstock is reacted in a plurality of reactors containing an admixture of a desired process catalyst and an adsorbent to form a product which is selectively adsorbed by the adsorbent and an admixture containing a product which is withdrawn from the reactor. A series of separation steps is used to desorb the product which is selectively adsorbed by the adsorbent and to prepare the reactor for a subsequent process cycle. The process utilizes a novel series of adsorption and desorption steps to collect the less selectively adsorbed product in substantially pure form under relatively constant flow rate at feedstock pressure.

22 Claims, 7 Drawing Sheets

$A+B \rightarrow C+D$ $A+B \rightarrow C+D$

PROCESS FOR OPERATING EQUILIBRIUM CONTROLLED REACTIONS

TECHNICAL FIELD OF THE INVENTION

The present invention is a process for operating equilibrium controlled reactions in continuous mode wherein a feedstock is reacted in a plurality of reactors containing an admixture of a desired process catalyst and an adsorbent to form a more adsorbable product which is selectively adsorbed by the adsorbent and a mixture containing primarily the less adsorbable product which is withdrawn from the reactor. A series of separation steps is used to desorb the more adsorbable product from the adsorbent and to prepare the reactor for a subsequent process cycle.

BACKGROUND OF THE INVENTION

The chemical industry performs numerous equilibrium controlled reactions to manufacture a wide range of chemical raw materials, intermediates and products. Product yield obtained in such equilibrium controlled reactions is typically limited by the thermodynamic equilibrium of the reaction. Therefore, such reactions are typically operated at an elevated temperature for endothermic reactions or at a reduced temperature for exothermic reactions in order to shift equilibrium toward the product direction. Thus, the chemical industry has been searching for improved processes for operating equilibrium controlled reactions at reduced temperatures for endothermic reactions wherein product yield is not substantially diminished due to unfavorable thermodynamic equilibrium constants.

Representative equilibrium controlled reactions include methane and hydrocarbon steam reforming reactions which are used to manufacture hydrogen or synthesis gas, the water gas shift reaction for converting CO to $CO_2$, as well as the reverse water gas shift reaction for converting $CO_2$ to CO. Some of these reactions are typically carried out at relatively high temperatures to shift the equilibrium toward the product direction as well as to obtain relatively faster reaction kinetics. Significant efforts have been described in the literature to improve reaction kinetics by identifying new catalysts and by controlling process operating conditions. Additionally, the concept of removing a product from a reaction zone to increase product conversion is well known.

Representative processes for operating equilibrium controlled reactions include an article by Vaporciyan and Kadlec (AIChE Journal, Vol. 33, No. 8, August 1987) which discloses a unit operation comprising a rapid pressure swing cycle in a catalytic-adsorbent bed to effect both continuous gas-phase reaction and separation. The hybrid device combines features of a cyclic-steady-state pressure swing adsorber with those of a flow-forced catalytic reactor.

Westerterp and coworkers (Hydrocarbon Processing) p. 69 (November 1988) disclose two process schemes for improving conversion of hydrogen and carbon monoxide to methanol. The first embodiment employs a Gas-Solid-Solid Trickle Flow Reactor (GSSTFR) wherein a solid adsorbent is trickled through a packed bed reactor to remove methanol from the reaction zone which results in increased production of methanol. The adsorbent saturated with methanol is collected On a continuous basis using multiple storage tanks wherein the methanol is desorbed by reducing the pressure. The second embodiment employs a Reactor System with Interstage Product Removal (RSIPR) wherein methanol is synthesized in several stages and removed utilizing a liquid solvent. High conversion of methanol per pass is achieved in a series of adiabatic or isothermal fixed bed reactors. Product is selectively removed in absorbers situated between the respective reactor stages.

J. Berty and coworkers (Chemtech, p. 624 October 1990) disclose a Solvent Methanol Process (SMP) wherein methanol is prepared using a reactor consisting of a fixed catalyst bed into which a stream of high boiling inert solvent is introduced concurrent with the synthesis gas stream. The solvent selectively absorbs methanol as soon as it is formed over the catalyst bed causing the methanol activity to remain low and to shift the equilibrium toward the product. The product-rich solvent is depressurized causing methanol to be released and lean solvent is recirculated to the reactor.

E. Kikuchi and coworkers (Stud. Surf. Sci. Catal., 61 (Nat. Gas Convers.), 509 (1991) disclose a process for producing hydrogen wherein a palladium membrane reactor is utilized to operate a methane steam reforming reaction. The reactor, formed by supporting a thin palladium-silver alloy membrane onto porous alumina ceramics, possesses infinite selectivity of hydrogen over other reactant and product gases and increases the conversion of hydrogen at high temperature in the methane-steam reforming operation. The investigators demonstrate that conversion to product is correlated to reduction in hydrogen concentration by permeation through the reactor. Conversion of reactants to products at low temperatures could be limited in such reactors because the driving force for hydrogen permeation decreases at low permeant partial pressures, thus resulting in a lower limit to the hydrogen partial pressure which can be achieved in the reactor.

Kirkby and Morgan (The 1991 Icheme Research Event) present a mathematical model which is stated to demonstrate the general advantages of simultaneously conducting reaction and separation steps wherein the residence time of the components can be manipulated independently within the reactor. The investigators postulate that the disclosed pressure swing reaction system is expected to be superior to conventional thermal cracking systems because the use of a suitably selected mixture of catalyst and adsorbent may result in lower reaction temperatures and may reduce the rate at which coking products are formed. Furthermore, the simultaneous separation of a product component from the reactor may permit conversions far in excess of the normal equilibrium values.

Goto and coworkers (Chemical Engineering Essays, Vol. 19, No. 6 (1993) disclose pressure swing adsorption processes for dehydrogenating cyclohexane using a hydrogen occlusion alloy. The investigators state that continuous process operation can be accomplished by staggering the reaction and adsorption phases in a plurality of reactors. The reactor bed can be regenerated by pressure swing adsorption. The pressure swing adsorption reactor is operated continuously by adsorbing the product within the reactor immediately as it is formed and desorbing the adsorbed product by applying vacuum and by purging with helium.

Prior art processes for conducting simultaneous reaction and adsorption steps have not achieved commercial success because product flow rates do not remain sufficiently constant and the desired products are present in unacceptably low concentrations with respect to the undesired reaction products, unreacted feedstock and purge fluids. Industry is searching for a process for operating equilibrium controlled reactions which can be operated in continuous mode at reduced reaction temperatures wherein a reaction product can be produced in substantially pure form at high conversion, under relatively constant flow rate and at feedstock pressure.

BRIEF SUMMARY OF THE INVENTION

The present invention relates to a continuous process for operating equilibrium controlled reactions which overcomes problems associated with prior art processes wherein product flow rates do not remain relatively constant and the desired product is present in unacceptably low concentrations with respect to other reaction products, unreacted feedstock as well as the purge and rinse fluids used to desorb the desired product from the adsorbent residing in the reactor. Applicants have overcome such problems by utilizing a plurality of reactors containing an admixture of an adsorbent and a catalyst suitable for conducting a desired equilibrium controlled reaction.

The feedstock is subjected to reaction conditions sufficient to convert the feedstock into a more adsorbable product which is selectively adsorbed by the adsorbent and a less adsorbable product which is collected at a relatively constant flow rate at feedstock pressure. Applicants' process presents an entirely new process cycle for obtaining high conversion of the less adsorbable product with respect to the adsorbent in a relatively pure state and for efficiently desorbing the more adsorbable product from the adsorbent and preparing each reactor for the next process cycle.

The most general embodiment of the process of Applicants' invention for operating equilibrium controlled reactions utilizes a plurality of reactors operated in a predetermined timed sequence in which the following steps are employed. The first step of the process comprises reacting a feedstock at a first pressure in a first reactor containing an admixture of an adsorbent and a catalyst suitable for conducting the equilibrium controlled reaction under reaction conditions sufficient to convert the feedstock into a more adsorbable product which is selectively adsorbed by the adsorbent and a less adsorbable product and withdrawing a stream comprised primarily of the less adsorbable product. This stream may comprise dilute amounts of unreacted feedstock and the more adsorbable product and may be separated to form a stream comprising pure less adsorbable product.

The subsequent steps of the process are designed to regenerate the reactor for a subsequent process cycle by removing the more adsorbable product from the reactor. The first reactor is countercurrently depressurized to a second pressure by withdrawing a mixture comprising unreacted feedstock, a portion of the less adsorbable product and a portion of the more adsorbable product. The first reactor is then countercurrently purged at the second pressure with a weakly adsorbing purge fluid with respect to the adsorbent to desorb the more adsorbable product from the adsorbent and a mixture comprising unreacted feedstock, a portion of the more adsorbable product and a portion of the less adsorbable product is withdrawn from the first reactor. This mixture comprising unreacted feedstock, the more adsorbable product and the less adsorbable product may be separated to form a stream comprising the more adsorbable product.

Next, the first reactor is countercurrently purged at the second pressure with the less adsorbable product to desorb the weakly adsorbing purge fluid and a mixture comprising the weakly adsorbable purge fluid, a portion of the more adsorbable product and a portion of the less adsorbable product is withdrawn from the first reactor. This mixture can be separated to form a stream comprising the weakly adsorbable purge fluid, a portion of which may be used as the weakly adsorbing purge fluid in the step described in the previous paragraph. Finally, the first reactor is countercurrently pressurized from the second pressure to the first pressure with the less adsorbable product prior to commencing another process cycle within the first reactor.

An alternate embodiment of Applicants' invention for operating an equilibrium controlled reaction utilizes an additional purging step between the first and second steps of the general embodiments described above. Again, the process utilizes a plurality of reactors operated in a predetermined timed sequence in which the following steps are employed. The first step of the process comprises reacting a feedstock at a first pressure in a first reactor containing an admixture of an adsorbent and a catalyst suitable for conducting the equilibrium controlled reaction under reaction conditions sufficient to convert the feedstock into a more adsorbable product which is selectively adsorbed by the adsorbent and a less adsorbable product and withdrawing a stream comprised primarily of the less adsorbable product at the feedstock pressure. This stream may also comprise dilute amounts of unreacted feedstock and the more adsorbable product, which stream may be separated to form a stream comprising pure less adsorbable product.

The alternate embodiment utilizes the following additional step compared to the general process embodiment wherein the first reactor is countercurrently purged at the first pressure with a weakly adsorbing purge fluid and a mixture comprising unreacted feedstock, a portion of the more adsorbable product and a portion of the less adsorbable product is withdrawn from the first reactor at the first pressure. Optionally, this mixture comprising the unreacted feedstock, the more adsorbable product and the less adsorbable product can be separated to form a stream comprising unreacted feedstock and the unreacted feedstock can be recycled for use as feedstock in step (a).

The subsequent steps of the process of the alternate embodiment are analogous to the general embodiment and are designed to regenerate the reactor by removing the more adsorbable product from the reactor. The first reactor is countercurrently depressurized to a second pressure by withdrawing a mixture comprising unreacted feedstock, a portion of the less adsorbable product and a portion of the more adsorbable product. The first reactor is then countercurrently purged at the second pressure with a weakly adsorbing purge fluid with respect to the adsorbent to desorb the more adsorbable product from the adsorbent and a mixture comprising unreacted feedstock, a portion of the more adsorbable product and a portion of the less adsorbable product is withdrawn from the first reactor. This mixture comprising unreacted feedstock, the more adsorbable product and less adsorbable product may be separated to form a stream comprising the more adsorbable product.

Next, the first reactor is countercurrently purged at the second pressure with the less adsorbable product to desorb the weakly adsorbing purge fluid and a mixture comprising the weakly adsorbable purge fluid, a portion of the more adsorbable product and a portion of the less adsorbable product is withdrawn from the first reactor. This mixture which comprises the weakly adsorbable purge fluid, the more adsorbable product and the less adsorbable product can be separated to form a stream comprising the weakly adsorbable purge fluid, a portion of which may be used as the weakly adsorbing purge fluid in the step described in the previous paragraph. Finally, the first reactor is countercurrently pressurized from the second pressure to the first pressure with the less adsorbable product prior to commencing another process cycle within the first reactor.

The present process can be utilized in any endothermic or exothermic equilibrium controlled process including homogeneous reactions involving solely gaseous reactants, and heterogeneous, catalytic reactions involving gaseous reactants. Moreover, the present process can be readily adapted for use in equilibrium controlled reactions which are capable of operation in the absence of a catalyst. The general and alternate embodiments are followed with the exception that the reactors contain only adsorbent for the more adsorbable product.

The two embodiments of the present invention have been described in general terms as utilizing a feedstock which is capable of being converted to one or more desired products, a reaction catalyst which is suitable for converting such feedstock to the desired products, an adsorbent which is capable of preferentially adsorbing one product over the other products and components of the feedstock, and a weakly adsorbing purge gas which is capable of desorbing the adsorbed product from the adsorbent.

While Applicants' invention is suitable for operating any equilibrium controlled process, Applicants have identified reactions which are particularly suited for operation using their claimed process. Preferred reactions include the reverse water gas shift reaction for producing carbon monoxide, the steam-methane reforming reaction for producing hydrogen, and methane reforming with carbon dioxide to produce carbon monoxide and hydrogen. The general and alternate embodiments of this invention can be used to operate each of these reactions by simply substituting the proper feedstock, adsorbent, catalyst, the relative proportion of catalyst and adsorbent residing in the reactor, the reaction conditions and purge fluids to provide the desired products. For example, the reverse water gas shift reaction for producing carbon monoxide contemplates reacting a feedstock of carbon dioxide and hydrogen to produce carbon monoxide and water. The more adsorbable product with respect to the adsorbent is water such that the less adsorbable product, carbon monoxide, can be collected at feedstock pressure.

Suitable adsorbents for conducting the reverse water gas shift reaction to the present invention include zeolites such as X, A, Y and the mordenites, and alumina such as Alcan AA300 and AA230 which are commercially available from Alcan Corporation, Cleveland, Ohio. Suitable catalysts include conventional water gas shift catalysts such as the iron-chromium high temperature shift catalyst from ICI Corporation, Oakbrook Terrace, Ill., K6-10 and K6-11 catalysts available from BASF Corporation, Geismer, La., and low and medium temperature shift catalysts such as R3-11 and K3-110 catalysts which are also commercially available from BASF Corporation, Geismer, La. Reaction conditions include a temperature ranging from 200° to 600° C., the first pressure which ranges from 2 to 50 bar and the second pressure which ranges from 1 bar to 2 bar. The weakly adsorbing purge fluid is selected from the group consisting of methane, hydrogen, steam, nitrogen and carbon dioxide.

The steam-methane reforming reaction for producing hydrogen contemplates reacting a feedstock of methane and water to produce hydrogen, carbon monoxide and carbon dioxide. Preference for carbon dioxide versus carbon monoxide can be partially controlled by varying the stoichiometry of the feedstock components and reaction conditions. The more adsorbable product with respect to the adsorbent is carbon monoxide or carbon dioxide such that the less adsorbable product, hydrogen, can be collected at feedstock pressure.

Suitable catalysts for conducting the steam-methane reforming reaction include conventional steam-methane reforming and prereforming catalysts such as nickel-alumina, nickel-magnesium alumina and the noble metal catalysts. The adsorbent can be selected to adsorb carbon monoxide, carbon dioxide or a mixture of carbon monoxide and carbon dioxide. For example, preferential adsorbents for carbon dioxide include the metal oxides and mixed metal oxides of magnesium, manganese, lanthanum and calcium and the clays minerals such as sepiolite and dolomite. Adsorbents which are selective toward carbon monoxide include $Cu^{+1}$ on silica-alumina and $Ag^{+1}$ on silica-alumina as described in U.S. Pat. Nos. 4,019,879 and 4,019,880.

The feedstock for the steam-methane reforming reaction comprises water and methane in a stoichiometric ratio of water to methane ranging from 1.5 to 30 when the more adsorbable product is primarily carbon dioxide and from 1 to 1.5 when the more adsorbable product is primarily carbon monoxide. The less adsorbable product is hydrogen in both cases. Reaction conditions include a temperature ranging from 200° to 700° C., the first pressure which ranges from 2 to 50 bar and the second pressure which ranges from 1 bar to 2 bar. The weakly adsorbing purge fluid is selected from the group consisting of methane, steam, hydrogen and nitrogen.

Methane can be reformed with carbon dioxide to produce carbon monoxide and hydrogen. Thus, the feedstock comprises carbon dioxide and methane, the catalyst comprises a methane reforming or prereforming catalyst such as nickel-alumina, nickel-magnesium alumina and the noble metal catalysts such as rhodium, ruthenium and iridium. Suitable adsorbents for hydrogen include the hydrogen-metal alloys such as palladium, palladium-silver, magnesium-nickel, iron-titanium and lanthanum-nickel, and the like. Suitable adsorbents for carbon monoxide include $Cu^+$ and $Ag^+$ salts. The more adsorbable product with respect to the adsorbent may be hydrogen and the less adsorbable product may be carbon monoxide. Alternatively, the more adsorbable product may be carbon monoxide and the less adsorbable product may be hydrogen. Reaction conditions comprise a temperature ranging from 200° to 700° C., the first pressure which ranges from 2 to 50 bar and the second pressure which ranges from 1 to 2 bar. The weakly adsorbing purge fluid is selected from the group consisting of steam, methane, carbon dioxide, carbon monoxide, nitrogen, and hydrogen.

As shall become more apparent upon reading the Detailed Description of the Invention, Applicants' process overcomes problems associated with prior art processes by utilizing a novel series of reaction, adsorption and desorption steps to collect the less adsorbable product in substantially pure form under a relatively constant flow rate at feedstock pressure. This result is accomplished in part by Applicants' unexpected use of a reaction product to puree the reactor and to pressurize the reactor to reaction pressure prior to commencing the reaction step in another cycle of the process.

While one of ordinary skill in the art would expect that the purging and pressurizing of the reactor with product prior to commencing the reaction step would undesirably shift the equilibrium constant toward the reactants, Applicants have discovered that purging the reactor with a reaction product instead of reactant or alternate purge fluid provides a highly efficient process wherein a desired product can be collected at feedstock pressure in substantially pure form at a relatively constant flow rate.

DETAILED DESCRIPTION OF THE INVENTION

Applicants' will now discuss in greater detail their process for operating equilibrium controlled reactions which provides numerous benefits over prior art processes. Specifically, greater conversion of feedstock to products per unit volume of reactor is achieved; a more concentrated reaction product is obtained than could be achieved using a conventional process wherein the reaction stage is segregated from the product adsorption stage; and the process can be operated at less stringent conditions because very favorable equilibrium may not be required.

The present process also provides another additional benefit in that the less adsorbable product with respect to the adsorbent residing in admixture with the catalyst within each reactor may be collected at a relatively constant flow rate at feedstock pressure. This result is accomplished in part by countercurrently purging the reactor with the less adsorbable product until breakthrough of the less adsorbable product occurs at the feed end of each reactor. The extent to which purge is required is dictated by the extent of purity required in the less adsorbable product to be collected during the reaction step. Moreover, the reactor is countercurrently repressurized to the initial process pressure with the less adsorbable product prior to commencing the next process cycle within each reactor.

While removing the more adsorbable product from the reactor immediately as it is formed in the reaction zone does not change the equilibrium constant for the particular equilibrium controlled reaction, substantially increased conversion of feedstock to products is achieved by practicing the combined steps of the process. In order to effect this objective, two key requirements must be met: First, the adsorbent must be active at the reaction conditions meaning that the adsorbent must retain its capacity and selectivity for the more adsorbable product. Second, the adsorbent must be chemically neutral and must not act as a catalyst for undesirable side reactions.

Figure 1:
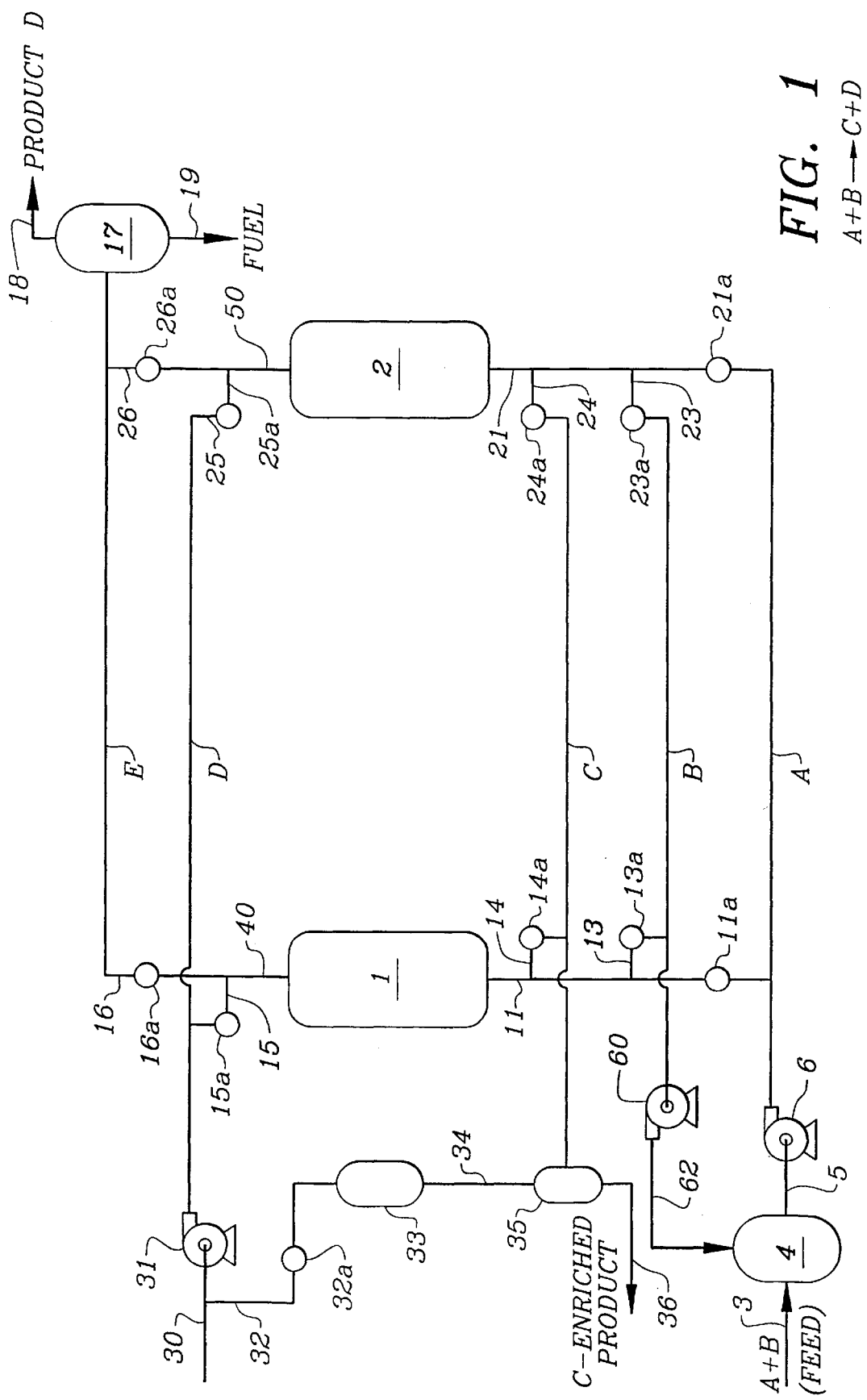
FIG. 1 is a process flow diagram of a general embodiment of the present process for operating equilibrium controlled reactions which utilizes two reactors containing an admixture of catalyst and adsorbent, which reactors are operated in cycle in a predetermined sequence.

The general embodiment of Applicant's process for operating equilibrium controlled reactions is described in FIG. 1 which illustrates a process flow diagram which utilizes two reactors which each containing an admixture of catalyst and adsorbent chosen for the desired equilibrium controlled reaction. The schematic consists of reactors 1 and 2; numerous control valves; manifolds A through E; pumps 6, 31 and 60; separators 17 and 35; and storage tanks 4 and 33. Feedstock comprising the reactants to be subjected to the desired equilibrium controlled reaction is drawn from storage tank 4 having inlet line 3 and outlet line 5 via pump 6 wherein the pressurized feedstock is introduced into manifold A.

Manifold A is in flow communication with branch inlet lines 11 and 21 which are connected to the inlet ends of reactors 1 and 2. Lines 11 and 21 are equipped with valves 11a and 21a, respectively. Opening of the appropriate valve permits the pressurized feedstock to flow through manifold A into the selected reactor being initially placed on stream. Thus, by opening valve 11a, while valve 21a is closed, feedstock may be caused to flow from manifold A, through line 11 and into reactor 1.

Reactors 1 and 2 are fitted at their respective outlet ends with lines 40 and 50 respectively, each equipped with control valves 16a and 26a, respectively. Lines 40 and 50 are operatively connected to manifold E via lines 16 and 26 through which a stream containing a mixture of components withdrawn from reactors 1 and 2 can be collected in separator 17. The mixture can be separated such that a stream containing the less adsorbable product, referred to as Product D, can be collected via line 18 and residuals may be collected via line 19 for fuel value or recycle. Thus, by opening the appropriate valve 16a or 26a, a mixture containing the less adsorbable product, product D, is caused to flow from the corresponding reactor through lines 40 and 16 or lines 50 and 26 into manifold E for passage into separator 17.

Reactors 1 and 2 are operatively connected to lines 11 and 21, each of which is in flow communication with lines 13 and 23. Lines 13 and 23 are provided with control valves 13a and 23a, respectively, such lines being in flow communication with manifold B. Manifold B can be placed in flow communication with reactor 1 or 2 via lines 13 and 23 upon opening valve 13a or 23a, respectively. Manifold B is also in flow communication with pump 60 which is connected to line 62 which can be used to recycle feedstock to storage tank 4.

Manifold C is in flow communication with reactors 1 and 2 via lines 14 and 10 24, each line which is equipped with valves 14a and 24a, respectively. Reactor effluent from reactors 1 and 2 may be passed through lines 14 and 24 into manifold C for separation in separator 35 into a stream which is enriched in the more adsorbable product, referred to as Product C, and a stream comprising weakly adsorbing purge fluid which can be passed into storage tank 33 via line 34 for later use.

Manifold D is connected to pump 31 which receives various process fluids via lines 30 and 32. Such process fluids pass through line 30 or line 32 and are pressurized via pump 31. The pressurized fluids may be passed through manifold D which in flow communication with reactors 1 and 2 via lines 15 and 25, respectively. Lines 15 and 25 are each fitted with valves 15a and 25a such that the flow of streams from Manifold D into reactors 1 and 2 can be controlled. Moreover, weakly adsorbing purge fluid from tank 33 can be transferred to pump 31 via lines 32 and 30 by opening valve 32a.

Operation of the embodiment represented in FIG. 1 will now be explained in connection with an arbitrarily chosen cycle having eight timed periods of ten minutes per period as set forth in Table 1. Although not limited thereto, the process as illustrated in FIG. 1 utilizes two reactors which are operated in cycle according to a predetermined timed sequence. Other arrangements using fewer or a greater number of reactors and the associated gas manifolds and switch valves may be employed, optionally using interrupted or discontinuous operation (using idling) of pumps. Other arrangements using more than two reactors may be employed by appropriate sequencing of the individual steps or periods of the process cycle.

adsorbable product. The depressurization step is continued until the reactor reaches the second predetermined pressure.

(c) Purge I—the reactor is countercurrently purged at the second pressure with a weakly adsorbing purge fluid with respect to the adsorbent to desorb Product C from the adsorbent and a mixture comprising unreacted feedstock, a portion of Product C and a portion of Product D is withdrawn from the reactor.

(d) Purge II—the reactor is countercurrently purged at the second pressure with Product D to desorb the weakly adsorbing purge fluid and a mixture comprising the weakly adsorbing purge fluid, a portion of Product C and a portion of Product D is withdrawn from the reactor.

(e) Pressurization—the reactor is countercurrently pressurized from the second pressure to the first pressure with Product D prior to commencing another process cycle within the reactor.

The valve positions during the above-mentioned operating cycle are also set forth in Table 1. The designation "O"

TABLE 1

Mode I:

| STEPS | TIME Minutes | 11a | 13a | 14a | 15a | 16a | 32a | 21a | 23a | 24a | 25a | 26a | 32a | STEPS Reactor-Sorber II |
|---|---|---|---|---|---|---|---|---|---|---|---|---|---|---|
| Sorpreaction | 0 to 10 | O | C | C | C | O | C | C | O | C | C | C | C | Depressurize |
| Sorpreaction | 10 to 20 | O | C | C | C | O | C | C | C | O | O | C | C | Purge I |
| Sorpreaction | 20 to 30 | O | C | C | C | O | C | C | C | O | O | C | C | Purge II |
| Sorpreaction | 30 to 40 | O | C | C | C | O | C | C | C | C | O | C | C | Pressurize |
| Depressurize | 40 to 50 | C | O | C | C | C | C | O | C | C | C | O | C | Sorpreaction |
| Purge I | 50 to 60 | C | C | O | O | C | C | O | C | C | C | O | C | Sorpreaction |
| Purge II | 60 to 70 | C | C | O | O | C | C | o | C | C | C | o | C | Sorpreaction |
| Pressurize | 70 to 80 | C | C | C | O | C | C | O | C | C | C | O | C | Sorpreaction |

According to the general embodiment of FIG. 1, each of the reactors 1 and 2 undergo four periods of the reaction/adsorption step, referred to as the sorpreaction step, one period of the depressurization step, one period of the Purge I step, one period of the Purge II step, and one period of the pressurization step. As illustrated in Table 1, the steps undertaken at startup in each of reactors 1 and 2 are staggered to enable at least one of the two reactors to undergo the sorpreaction step at all times during the process cycle. The operation of the invention described in FIG. 1 involves principally the following sequence of steps:

(a) Sorpreaction—feedstock at a first predetermined pressure is passed through the reactor containing an admixture of catalyst and adsorbent preferentially selective toward retention of the more adsorbable product, referred to as Product C, wherein an effluent stream enriched in the less adsorbable product, referred to as Product D, is withdrawn from the reactor. Product C is selectively adsorbed by the adsorbent and a reaction mass transfer zone (RMTZ) is formed inside the reactor which moves toward the outlet or discharge end of the reactor as more feedstock is passed through the reactor. The adsorbent at the leading edge of the RMTZ is essentially free of the trailing edge of the RMTZ and is equilibrated with the more adsorbable product at the local conditions. The sorpreaction step is continued until the adsorbent in the reactor is essentially saturated with Product C. In other words, the adsorption RMTZ has reached the effluent end of the reactor or somewhat short of it. The effluent gas, rich in Product D is discharged from the reactor.

(b) Depressurization—the reactor is countercurrently depressurized to a second predetermined pressure by withdrawing a mixture comprising unreacted feedstock, a portion of the more adsorbable product and a portion of the less indicates that a specified valve is open while a "C" represents that a specified valve is closed. The operative sequence of steps occurring in reactor 1 during a complete process cycle will now be described in exhaustive detail so that operation of a continuous process will be fully understood. The identical sequence of steps according to Table 1 occurs in staggered sequence in reactor 2.

Again, referring to the embodiment disclosed in FIG. 1 and the sequence periods and valve positions designated in Table 1, reactor 1 undergoes four sequence periods of the sorpreaction step. Feedstock comprising reactants A and B, stored in storage tank 4, is introduced into reactor 1 by opening valves 11a and 16a and closing valves 13a, 14a and 15a thereby allowing feedstock to flow through manifold A, line 11 and into reactor 1 which contains an admixture of a desired catalyst and an adsorbent preferentially selective toward the more adsorbable product, Product C.

The sorpreaction is continued until reactor 1 is essentially saturated with adsorbed Product C. Product C is selectively adsorbed onto the adsorbent and a reaction mass transfer zone (RMTZ) is formed within reactor 1 which moves toward the discharge end of reactor 1 as more feedstock is passed. The sorpreaction is completed when the MTZ reaches the effluent end of the reactor or somewhat short of it by a predesigned set point.

A mixture which is enriched in the less adsorbable product and depleted in the more adsorbable product as well as unreacted feedstock exits the discharge end of reactor 1 via lines 40 and 16 and flows into manifold E for collection in separator 17. Optionally, the mixture in separator 17 can be separated by conventional techniques such as pressure swing adsorption, thermal swing adsorption or distillation or condensation to form a stream comprising the less adsorbable product, Product D, which is discharged from separator 17 via line 18 and the remainder of the components of the mixture are discharged via line 19.

The process proceeds with one period of the depressurization step wherein reactor 1 is countercurrently depressurized to a second predetermined pressure by withdrawing a mixture comprising unreacted feedstock, a portion of the more adsorbable product and a portion of the less adsorbable product from the inlet end of reactor 1. Valve 13a is opened while valves 11a and 14a remain closed allowing the mixture to be passed through lines 11 and 13 into manifold B and in flow communication with pump 60. The mixture exits the discharge end of pump 60 proceeding via line 62 for use as fuel (not shown) or recycle into storage tank 4 for use as feedstock in a subsequent process cycle. The depressurization step is continued until the reactor reaches the second predetermined pressure.

Reactor 1 is then subjected to one period of the purge I step. Reactor 1 is countercurrently purged at the second pressure with a weakly adsorbing purge fluid with respect to the adsorbent. Upon opening valves 14a and 15a while valves 25a and 32a remain in the closed position, weakly adsorbing purge fluid from an external source passes through pump 31 via line 30 and exits pump 31 at the second pressure to proceed via manifold D, line 15 and line 40 into the exit end of reactor 1. A mixture comprising unreacted feedstock, weakly adsorbing purge fluid, a portion of Product C and a portion of Product D is withdrawn from reactor 1 via line 11, line 14 and manifold C and is collected in separator 35. This mixture may be used as fuel, discharged for use outside the process or separated in separator 35 to form a stream of weakly adsorbing purge gas. A portion of the weakly adsorbing purge fluid may be transferred through line 34 into storage tank 33 for future use. Upon demand via opening valve 32a, weakly adsorbing purge fluid may be drawn to pump 31 via lines 32 and 30 for use in subsequent process cycles.

Reactor 1 is then subjected to one period of the purge II step wherein reactor 1 is countercurrently purged with the less adsorbable product, Product D. Upon opening valves $^{14}$a and 15a while valves 25a and 32a remain in the closed position, the less adsorbable product from an external source passes through pump 31 via line 30 and exits pump 31 at the second pressure to proceed via manifold D, line 15 and line 40 into the exit end of reactor 1. A mixture comprising unreacted feedstock, a portion of Product C and a portion of Product D is withdrawn from reactor 1 via line 11, line 14 and manifold C and is collected in separator 35. This mixture may be used as fuel, discharged for use outside the process or separated in separator 35 to form a stream of the weakly adsorbing purge fluid which may be transferred through line 34 into storage tank 33 for future use. Upon demand via opening valve 32a, such weakly adsorbing purge fluid may be drawn to pump 31 via lines 32 and 30 for use in subsequent process cycles.

The final step of the process cycle involves a single sequence of the pressurization step wherein reactor 1 is countercurrently pressurized from the second pressure to the first pressure with Product D prior to commencing another process cycle within the reactor. Specifically, upon opening valve 15a while valves 11a, 13a, 14a, 25a and 32a remain in the closed position, the less adsorbable product passes through pump 31 via line 30 and exits pump 31 at the second pressure to proceed via manifold D, line 15 and line 40 into the exit end of reactor 1. This step is stopped when reactor 1 reaches the first pressure.

The process proceeds through additional cycles according to the above-mentioned steps enumerated in Table 1. While the sequence period being of equal length, this is neither required or necessary. The times will be set by allowable maximum gas flow rates, valve and line sizes and the properties of the adsorbent used. Alternate routines may be employed for establishing the duration of each of the cycle steps. For example, the end of a particular step may be determined by other techniques known in the art such as by analysis of the composition of the reactor effluent.

Figure 2:
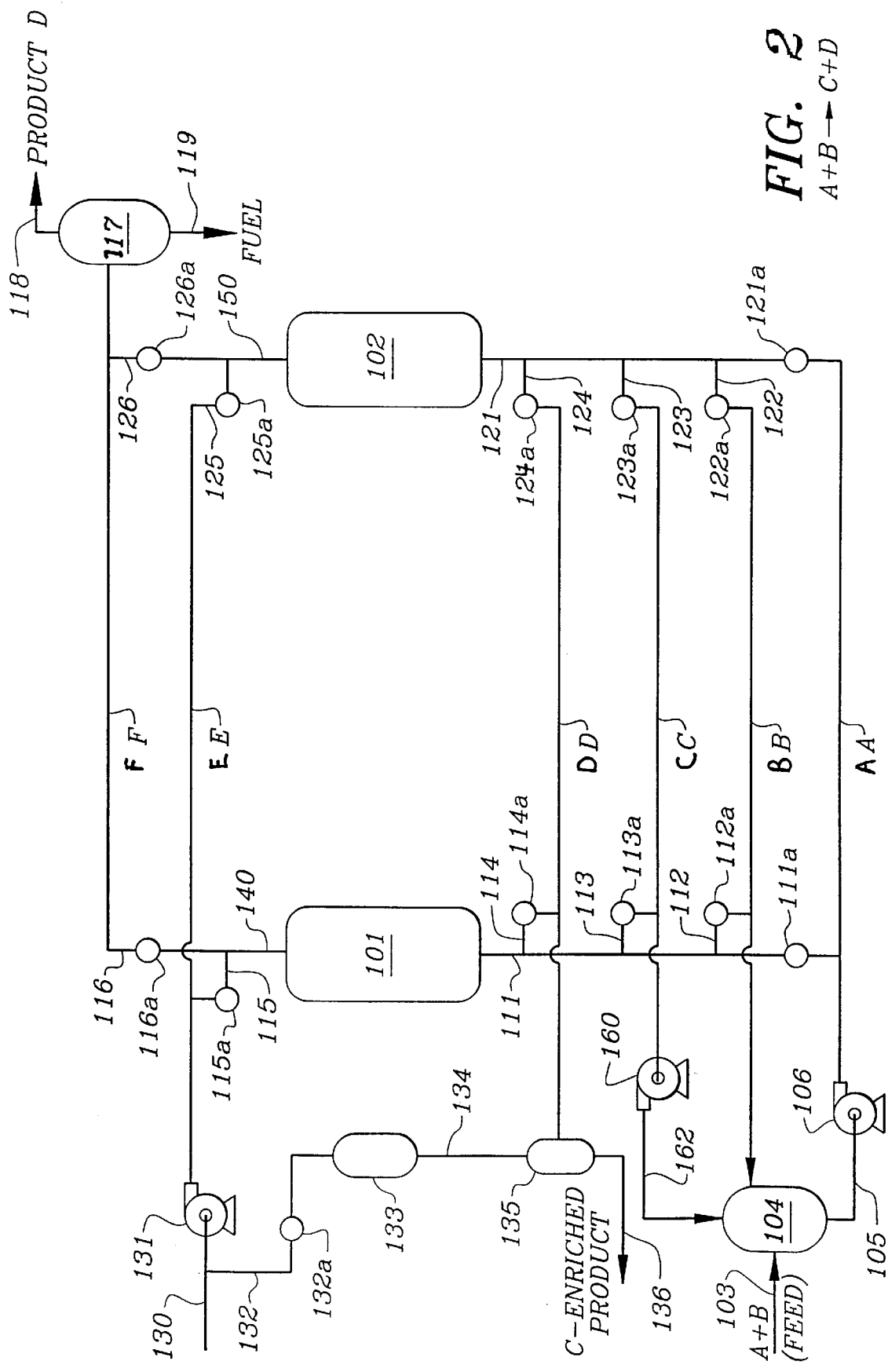
FIG. 2 is a process flow diagram of an alternate embodiment of the process for operating equilibrium controlled reactions which utilizes two reactors containing an admixture of catalyst and adsorbent, which reactors are operated in cycle in a predetermined sequence.

An alternate embodiment of Applicant's process for operating equilibrium controlled reactions is described in FIG. 2 which illustrates a process flow diagram which utilizes two reactors which each contain an admixture of catalyst and adsorbent chosen for the desired equilibrium controlled reaction. The schematic consists of reactors 101 and 102; numerous control valves; manifolds AA through FF; pumps 106, 131 and 160; separators 117 and 135; and storage tanks 104 and 133. Feedstock comprising the reactants to be subjected to the desired equilibrium controlled reaction is drawn from storage tank 104 having inlet line 103 and outlet line 105 via pump 106 wherein the pressurized feedstock is introduced into manifold AA.

Manifold AA is in flow communication with branch inlet lines 111 and 121 which are connected to the inlet ends of reactors 101 and 102. Lines 111 and 121 are equipped with valves 111a and 121a, respectively. Opening of the appropriate valve permits the pressurized feedstock to flow through manifold AA into the selected reactor being initially placed on stream. Thus, by opening valve 111a, while valve 121a is closed, feedstock may be caused to flow from manifold AA, through line 111 and into reactor 101.

Reactors 101 and 102 are fitted at their respective outlet ends with lines 140 and 150 respectively, each equipped with control valves 116a and 126a, respectively. Lines 140 and 150 are operatively connected to manifold FF via lines 116 and 126 through which a stream containing a mixture of components withdrawn from reactors 101 and 102 can be collected in separator 117. The mixture can be separated such that a stream containing the less adsorbable product, referred to as Product D, can be collected via line 118 and residuals may be collected via line 119 for fuel value or recycle. Thus, by opening the appropriate valve 116a or 126a, a mixture containing the less adsorbable product, product D, is caused to flow from the corresponding reactor through lines 140 and 116 or lines 150 and 126 into manifold FF for passage into separator 117.

Reactors 101 and 102 are operatively connected to lines 111 and 121, each which is in flow communication with lines 112 and 122. Lines 112 and 122 are provided with control valves 112a and 122a, respectively, such lines being in flow communication with manifold BB. Manifold BB can be placed in flow communication with reactor 101 or 102 via lines 112 and 113 upon opening valve 112a or 122a, respectively. Manifold BB is also in flow communication with storage tank 104 which receives feedstock to be recycled during a subsequent process cycle.

Reactors 101 and 102 arc operatively connected to lines 111 and 121, each which is in flow communication with lines 113 and 123. Lines 113 and 123 are provided with control valves 113a and 123a, respectively, such lines being in flow communication with manifold CC. Manifold CC can be placed in flow communication with reactor 101 or 102 via lines 113 and 123 upon opening valve 113a or 123a, respectively. Manifold CC is also in flow communication with pump 160 which is connected to line 162 which can be used to recycle feedstock to storage tank 104.

Manifold DD is in flow communication with reactors 101 and 102 via lines 114 and 124, each line which is equipped with valve 1 14a and 124a, respectively. Reactor effluent from reactors 101 and 102 may be passed through lines 114 and 124 into manifold DD for separation in separator 135 into a stream which is enriched in the more adsorbable product, referred to as Product C and a stream comprising weakly adsorbing purge fluid which can be passed into storage tank 133 via line 134 for later use.

Manifold EE is connected to pump 131 which receives various process fluids via lines 130 and 132. Such process fluids pass through line 130 or line 132 and are pressurized via pump 131. The pressurized fluids may be passed through manifold EE which is in flow communication with reactors 101 and 102 via lines 115 and 125, respectively. Lines 115 and 125 are each fitted with valves 115a and 125a such that the flow of streams from Manifold EE into reactors 101 and 102 can be controlled. Moreover, weakly adsorbing purge fluid from tank 133 can be transferred to pump 131 via lines 132 and 130 by opening valve 132a.

Operation of the alternate embodiment represented in FIG. 2 will now be explained in connection with an arbitrarily chosen cycle having ten timed periods of ten minutes per period as set forth in Table 2. Although not limited thereto, the process as illustrated in FIG. 2 utilizes two reactors which are operated in cycle according to a predetermined timed sequence. Other arrangements using fewer or a greater number of reactors and associated gas manifolds and switch valves may be employed, optionally using interrupted or discontinuous operation (using idling) of pumps. Other arrangements using more than two reactors may be employed by appropriate sequencing of the individual steps or periods of the process cycle.

and a reaction mass transfer zone (RMTZ) is formed inside the reactor which moves toward the outlet or discharge end of the reactor as more feedstock is passed through the reactor. The adsorbent at the leading edge of the RMTZ is essentially free of Product C and the adsorbent at the trailing edge of the RMTZ is essentially equilibrated with Product C at the local conditions. The sorpreaction step is continued until the adsorbent is essentially saturated with Product C. In other words, the RMTZ has reached the effluent end of the column or somewhat short of it. The effluent gas, rich in Product D is discharged from the reactor.

(b) High Pressure Purge—the reactor is countercurrently purged at he first pressure with a weakly adsorbing purge fluid and a mixture comprising unreacted feedstock, a portion of the more adsorbable product and a portion of the less adsorbable product is withdrawn from the reactor at the first pressure. The step is stopped at a point in which the reactor is essentially free of feedstock components.

(c) Depressurization—the reactor is countercurrently depressurized to a second predetermined pressure by withdrawing a mixture comprising unreacted feedstock, a portion of the more adsorbable product and a portion of the lets adsorbable product. The depressurization step is continued until the reactor reaches the second predetermined pressure.

(d) Purge I—the reactor is countercurrently purged at the second pressure with a weakly adsorbing purge fluid with respect to the adsorbent to desorb Product C from the adsorbent and a mixture comprising unreacted feedstock, a portion of Product C and a portion of Product D is withdrawn from the reactor.

(e) Purge II—the reactor is countercurrently purged at the second pressure with Product D to desorb the weakly

TABLE 2

Mode II:

| STEPS | TIME Minutes | 111a | 112a | 113a | 114a | 115a | 116a | 132a | 121a | 122a | 123a | 124a | 125a | 126a | 132a | STEPS Reactor-Sorber II |
|---|---|---|---|---|---|---|---|---|---|---|---|---|---|---|---|---|
| Sorpreaction | 0 to 10 | O | C | C | C | C | O | C | C | O | C | C | O | C | C | Purge, Ph |
| Sorpreaction | 10 to 20 | O | C | C | C | C | O | C | C | C | O | C | C | C | C | Depressurize |
| Sorpreaction | 20 to 30 | O | C | C | C | C | O | C | C | C | C | O | O | C | C | Purge I, P1 |
| Sorpreaction | 30 to 40 | O | C | C | C | C | O | C | C | C | Q | O | O | C | C | Purge II, P1 |
| Sorpreaction | 50 to 60 | O | C | C | C | C | O | C | C | C | C | C | O | C | C | Pressurize |
| Purge, Ph | 50 to 60 | C | O | C | C | O | C | C | O | C | C | C | C | O | C | Sorpreaction |
| Depressurize | 60 to 70 | C | C | O | C | C | C | C | O | C | C | C | C | O | C | Sorpreaction |
| Purge I, P1 | 70 to 80 | C | C | C | O | O | C | C | O | C | C | C | C | O | C | Sorpreaction |
| Purge II, P1 | 80 to 90 | C | C | C | O | O | C | C | O | C | C | C | C | O | C | Sorpreaction |
| Pressurize | 90 to 100 | C | C | C | C | O | C | C | O | C | C | C | C | O | C | Sorpreaction |

According to the alternate embodiment of FIG. 2, each of the reactors 101 and 102 undergo five periods of the sorpreaction step, one period of the high pressure purge step, one period of the depressurization step, one period of the Purge I step, one period of the Purge II step, and one period of the pressurization step. As illustrated in Table 2, the steps undertaken at startup in each of reactors 101 and 102 are staggered to enable at least one of the two reactors to undergo the sorpreaction step at all times during each process cycle. The operation of the invention described in FIG. 2 involves principally the following sequence of steps:

(a) Sorpreaction—feedstock at a first predetermined pressure is passed through the reactor containing an admixture of catalyst and adsorbent preferentially selective toward retention of the more adsorbable product, referred to as Product C, wherein an effluent stream enriched in the less adsorbable product, referred to as Product D, is withdrawn from the reactor. Product C is selectively adsorbed by the adsorbent adsorbing purge fluid and a mixture comprising the weakly adsorbing purge fluid, a portion of Product C and a portion of Product D is withdrawn from the reactor.

(f) Pressurization—the reactor is countercurrently pressurized from he second pressure to the first pressure with Product D prior to commencing another process cycle within the reactor.

The valve positions during the above-mentioned operating cycle are set forth in Table 2. The designation "O" indicates that a specified valve is open while a "C" represents that specified valve is closed. The operative sequence of steps occurring in reactor 101 during a complete process cycle will now be described in exhaustive detail so that operation of a continuous process will be fully understood. The identical sequence of steps according to Table 2 occurs in staggered sequence in reactor 102.

Again, referring to the alternate embodiment disclosed in FIG. 2 and the sequence periods and valve positions designated in Table 2, adsorption column 101 undergoes five sequence periods of the sorpreaction step. Feedstock comprising reactants A and B, stored in storage tank 104, is introduced into reactor 101 by opening valves 111*a* and 116*a* and closing valves 112*a*, 113*a*, 114*a* and 115*a* thereby allowing feedstock to flow through manifold AA, line 111 and into reactor 101 which contains an admixture of a desired catalyst and an adsorbent preferentially selective toward the more adsorbable product, Product C. The sorpreaction is continued until reactor 101 is essentially saturated with adsorbed Product C.

Product C is selectively adsorbed onto the adsorbent and a reactor mass transfer zone (RMTZ) is formed within reactor 101 which moves toward the discharge end of reactor 101 as more feedstock is passed. The sorpreaction is completed when the RMTZ reaches the effluent end of the column or somewhat short of it by a predesigned set point. A mixture which is enriched in the less adsorbable product, depleted in the more adsorbable product as well as containing unreacted feedstock exits the discharge end of reactor 101 via lines 140 and 116 and flows into manifold FF for collection in separator 117.

Optionally, the mixture in separator 117 can be separated by conventional techniques such as pressure swing adsorption, thermal swing adsorption, distillation or condensation to form a stream comprising the less adsorbable product which is discharged from separator 117 via line 118 and the remainder of the components of the mixture which are discharged via line 119.

The process proceeds with one period of a high pressure purge step wherein reactor 101 is countercurrently purged with a weakly adsorbing purge fluid. Upon opening valves 112*a* and 115*a* while valves 125*a* and 132*a* remain in the closed position, weakly adsorbing purge fluid from an external source passes through pump 131 via line 130 and exits pump 131 at the first pressure to proceed via manifold EE, line 115 and line 140 into the exit end of reactor 101. A mixture comprising unreacted feedstock, a portion of product C and a portion of product D is withdrawn from reactor 101 via line 111, line 112 and manifold BB and is recycled to tank 104. This mixture may be used as fuel, discharged for use outside the process or recycled for use as feedstock to tank 104.

The process proceeds with one period of the depressurization step wherein reactor 101 is countercurrently depressurized to a second predetermined pressure by withdrawing a mixture comprising unreacted feedstock, a portion of the more adsorbable product and a portion of the less adsorbable product from the inlet end of reactor 101. Valve 113*a* is opened while valves 111*a*, 112A and 114*a* remain closed allowing the mixture to be passed through lines 111 and 113 into manifold CC and via pump 160. The mixture exits the discharge end of pump 160 proceeding via line 162 for use as fuel (not shown) or recycle into storage tank 104 for use as feedstock in a subsequent process cycle or optionally recycled (not shown) into separator 135. The depressurization step is continued until the reactor reaches the second predetermined pressure.

Reactor 101 is then subjected to one period of the purge I step. Reactor 101 is countercurrently purged at the second pressure with a weakly adsorbing purge fluid with respect to the adsorbent. Upon opening valves 114*a* and 115*a* while valves 125*a* and 132*a* remain in the closed position, weakly absorbing purge fluid from an external source passes through pump 131 via line 130 and exits pump 131 at the second pressure to proceed via manifold EE, line 115 and line 140 into the exit end of reactor 101. A mixture comprising unreacted feedstock, a portion of Product C and a portion of Product D is withdrawn from reactor 101 via line 111, line 114 and manifold DD and is collected in separator 135. This mixture may be used as fuel, discharged for use outside the process or separated in separator 135 to form a stream of the weakly adsorbing purge fluid. A portion of the weakly adsorbing purge fluid may be transferred through line 134 into storage tank 133 for future use. Upon demand via opening valve 132*a*, the weakly adsorbing purge fluid may be drawn to pump 131 via lines 132 and 130 for use in subsequent process cycles.

Reactor 101 is then subjected to one period of the purge II step wherein reactor 101 is countercurrently purged with the less adsorbable product. Upon opening valves 114*a* and 115*a* while valves 125*a* and 132*a* remain in the closed position, the more adsorbable product from an external source passes through pump 131 via line 130 and exits pump 131 at the second pressure to proceed via manifold EE, line 115 and line 140 into the exit end of reactor 101. A mixture comprising unreacted feedstock, a portion of Product C and a portion of Product D is withdrawn from reactor 101 via line 111, line 114 and manifold DD and is collected in separator 135. This mixture may be used as fuel, discharged for use outside the process or separated in separator 135 to form a stream of the weakly adsorbing purge fluid which may be transferred through line 134 into storage tank 133 for future use. Upon demand via opening valve 132*a*, such weakly adsorbing purge fluid may be drawn to pump 131 via lines 132 and 130 for use in subsequent process cycles.

The final step of the process cycle involves a single sequence of the pressurization step wherein reactor 101 is countercurrently pressurized from the second pressure to the first pressure with Product D prior to commencing another process cycle within the reactor. Specifically, upon opening valve 115*a* while valves 114*a*, 125*a* and 132*a* remain in the closed position, the less adsorbable product passes through pump 131 via line 130 and exits pump 131 at the second pressure to proceed via manifold EE, line 115 and line 140 into the exit end of reactor 101. The step is stopped when reactor 101 reaches the first pressure.

The process proceeds according to the above-mentioned steps enumerated in Table 2. While the sequence periods are depicted as being of equal length, this is neither required or necessary. The times will be set by allowable maximum gas flow rates, valve and line sizes and the properties of the adsorbent used. Alternate routines may be employed for establishing the duration of each of the cycle steps. For example, the end of a particular step may be determined by other techniques known in the art such as by analysis of the composition of the adsorption column effluent.

Having described Applicants' invention according to the general and alternate embodiments, Applicants have identified reactions which are particularly suited for operation using their claimed process. Preferred reactions include the reverse water gas shift reaction for producing carbon monoxide, the steam-methane reforming reaction for producing hydrogen, and methane reforming with carbon dioxide to produce carbon monoxide and hydrogen. The general and alternate embodiments of this invention can be used to operate each of these reactions by simply substituting the proper feedstock, adsorbent, catalyst, the relative proportion of catalyst and adsorbent residing in the reactor, the reaction conditions and purge fluids to provide the desired products. For example, the reverse water gas shift reaction for producing carbon monoxide contemplates reacting a feedstock of carbon dioxide and hydrogen to produce carbon monoxide and water. The more adsorbable product with respect to the adsorbent is water such that the less adsorbable product, carbon monoxide, can be collected at feedstock pressure.

Suitable adsorbents for conducting the reverse water gas shift reaction to the present invention include zeolites such as X, A, Y and the mordenites, and aluminas such as Alcan AA300 and AA230 which are commercially available from Alcan Corporation, Cleveland, Ohio. Suitable catalysts include conventional water gas shift catalysts such as the iron-chromium high temperature shift catalyst from ICI Corporation, Oakbrook Terrace, Ill., K6-10 and K6-11 catalysts available from BASF Corporation, Geismer, La., and low and medium temperature shift catalysts such as R3-11 and K3-110 catalysts which are also commercially available from BASF Corporation, Geismer, La. Reaction conditions include a temperature ranging from 200° to 600° C., the first pressure which ranges from 2 to 50 bar and the second pressure which ranges from 1 bar to 2 bar. The weakly adsorbing purge fluid is selected from the group consisting of methane, hydrogen, steam, nitrogen and carbon dioxide.

The steam-methane reforming reaction for producing hydrogen contemplates reacting a feedstock of methane and water to produce hydrogen, carbon monoxide and carbon dioxide. Preference for carbon dioxide versus carbon monoxide can be partially controlled by varying the stoichiometry of the feedstock components and reaction conditions. The more adsorbable product with respect to the adsorbent is carbon monoxide or carbon dioxide such that the less adsorbable product, hydrogen, can be collected at feedstock pressure.

Suitable catalysts for conducting the steam-methane reforming reaction include conventional steam-methane reforming and prereforming catalysts such as nickel-alumina, nickel-magnesium alumina and the noble metal catalysts. The adsorbent can be selected to adsorb carbon monoxide, carbon dioxide or a mixture of carbon monoxide and carbon dioxide. For example, preferential adsorbents for carbon dioxide include the metal oxides and mixed metal oxides of magnesium, manganese, lanthanum and calcium and the clays minerals such as sepiolite and dolomite. Adsorbents which are selective toward carbon monoxide include $Cu^{+1}$ on silica-alumina and $Ag^{+1}$ on silica-alumina as described in U.S. Pat. Nos. 4,019,879 and 4,019,880.

The feedstock for the steam-methane reforming reaction comprises water and methane in a stoichiometric ratio of water to methane ranging from 1.5 to 30 when the more adsorbable product is primarily carbon dioxide and from 1 to 1.5 when the more adsorbable product is primarily carbon monoxide. The less adsorbable product is hydrogen in both cases. Reaction conditions include a temperature ranging from 200° to 700° C., the first pressure which ranges from 2 to 50 bar and the second pressure which ranges from 1 bar to 2 bar. The weakly adsorbing purge fluid is selected from the group consisting of methane, steam, hydrogen and nitrogen.

Methane can be reformed with carbon dioxide to produce carbon monoxide and hydrogen. Thus, the feedstock comprises carbon dioxide and methane, the catalyst comprises a methane reforming or prereforming catalyst such as nickel-alumina, nickel-magnesium alumina and the noble metal catalysts such as rhodium, ruthenium and iridium. Suitable adsorbents for hydrogen include the hydrogen-metal alloys such as palladium, palladium-silver, magnesium-nickel, iron-titanium and lanthanum-nickel, and the like. Suitable adsorbents for carbon monoxide include $Cu^+$ and $Ag^+$ salts. The more adsorbable product with respect to the adsorbent may be hydrogen and the less adsorbable product may be carbon monoxide. Alternatively, the more adsorbable product may be carbon monoxide and the less adsorbable product may be hydrogen. Reaction conditions comprise a temperature ranging from 200° to 700° C., the first pressure which ranges from 2 to 50 bar and the second pressure which ranges from 1 to 2 bar. The weakly adsorbing purge fluid is selected from the group consisting of steam, methane, carbon dioxide, carbon monoxide, nitrogen, and hydrogen.

While removing the more adsorbable product from the reactor immediately as it is formed does not change the equilibrium constant for the particular equilibrium controlled reaction, substantially increase reactor throughput is achieved by practicing the combined steps of the process. In order to effect this objective, two key requirements must be met: First, the adsorbent must be active at the reaction conditions meaning that such the adsorbent must retain its capacity and selectivity for the more adsorbable product. Second, the adsorbent must be chemically neutral and must not act as a catalyst for the desired equilibrium controlled reaction.

The ratio by weight of catalyst and adsorbent can be widely varied depending upon the particular requirements of a particular catalyzed equilibrium controlled reaction to be operated under the present invention. As stated, earlier in the Specification, the general and alternate embodiments of the present invention are suitable for operating equilibrium controlled reactions which are capable of being operated in the absence of a catalyst. No Special techniques are required to prepare the admixture of catalyst and adsorbent to be placed in each reactor. The catalyst and adsorbent are simply mixed together by conventional means in order to disperse the catalyst and adsorbent. The catalyst and adsorbent to be mixed should desirably possess compatible average particle sizes such that the catalyst and adsorbent do not segregate into domains during operation of the process.

The term, weakly adsorbing fluid, refers to a fluid which is capable of displacing the product which is adsorbed by the adsorbent during operation of the process and which can then be desorbed by the less adsorbing product such that subsequent process cycles can be conducted in each reactor. One of ordinary skill in the art can readily select one or a mixture of weakly adsorbing fluids suitable for use in the claimed invention.

The general and alternate embodiments of the present invention can be operated using conventional hardware. For example, suitable reactors include any vessel which is capable of being subjected to the reaction conditions required to practice a particular equilibrium controlled process such as shell and tube reactors. Moreover, the separators enumerated in the process are readily selected by one of ordinary skill in the art based upon considerations such as the particular mixtures to be separated, the volume of fluids to be separated and the like.

The following examples are provided to further illustrate Applicants' process for operating equilibrium controlled reactions. The examples are illustrative and are not intended to limit the scope of the appended claims.

EXAMPLE 1

Reverse Water-Gas Shift Reaction for Producing Carbon Monoxide

The reverse water-gas shift reaction for manufacturing carbon monoxide was theoretically evaluated in order to test Applicants' process for controlling equilibrium controlled reactions. The process, $CO_2 + H_2 \leftrightarrows CO + H_2O$ is especially of interest because the reaction is typically performed at a high temperature (>800° C.) because it results in low equilibrium conversions at lower temperatures (especially at <500° C.). The process is further complicated by side reactions at high temperatures which result in the formation of carbon which deactivates the catalyst. Calculations performed using temperature versus thermodynamic equilibrium constant data found in the literature indicate that if an adsorbent such as NaX zeolite could be used to remove 99.9% of the water formed in the reaction zone, conversions of greater than 80% would be possible at about 300° C.

Applicants experimentally tested the general embodiment of their invention using the reverse water gas shift reaction as a representative equilibrium controlled reaction. The process was operated under the following conditions: Reaction Temperature=275° C.; Reaction Pressure=57 psig; $H_2$ flow rate=100 cc/min; $CO_2$ flow rate=100 cc/min; 1:1 (by weight) physically admixed low temperature shift catalyst and NaX zeolite adsorbent pellets; Gas in reactor prior to admission of reactants=CO at 57 psig and 275° C.; Total moles CO in reactor system prior to introduction of reactants=0.17 gram mole.

Figure 3:
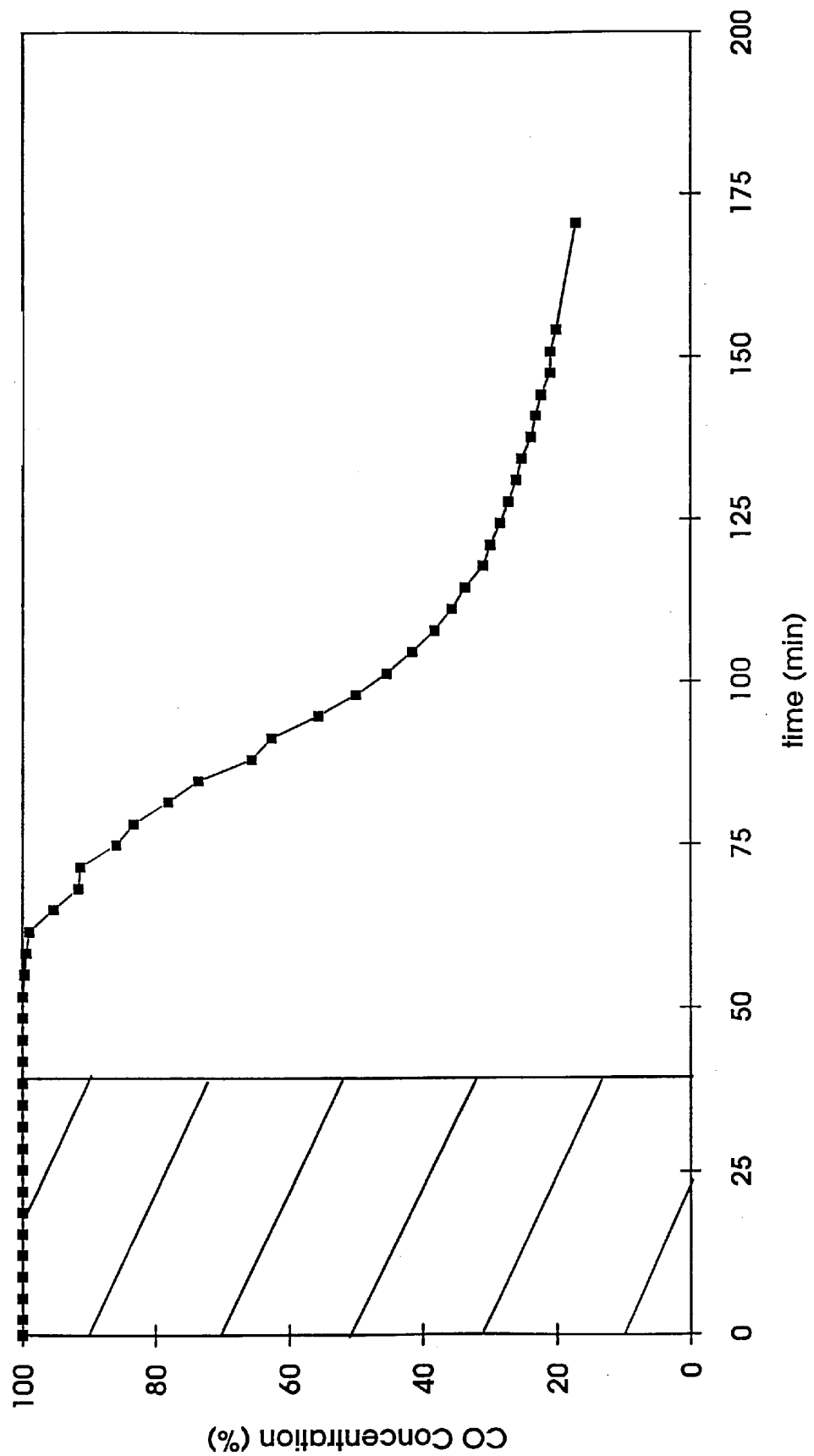
FIG. 3 illustrates the CO concentration profile in reactor effluent versus time for the reverse water gas shift reaction carried out according to the present process at 57 psig and 275° C. Carbon monoxide was used as the purge fluid and the pressurizing fluid.
Figure 4:
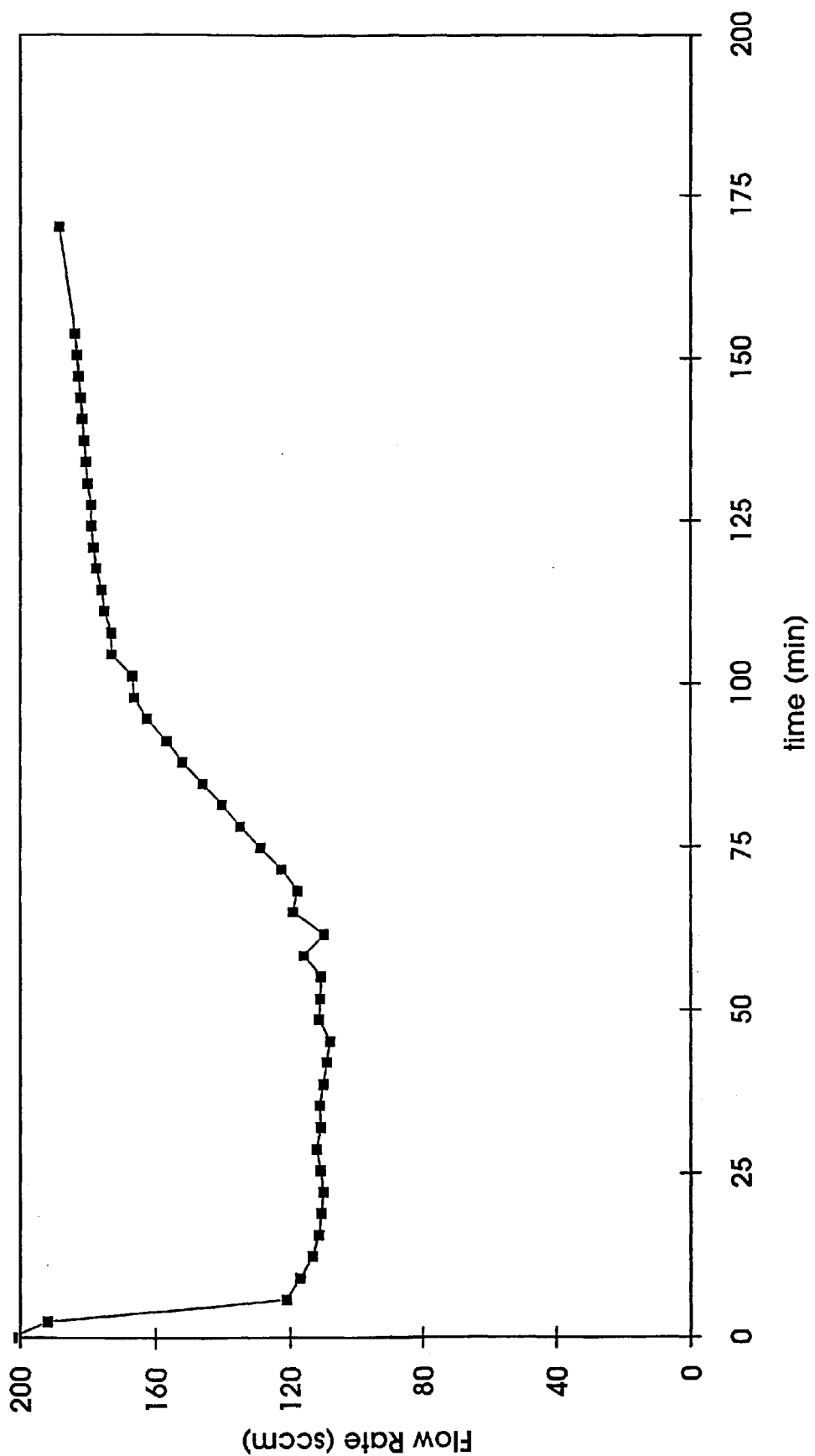
FIG. 4 illustrates the reactor effluent flow rate versus for the reverse water gas shift reaction carried out according to the present process at 57 psig and 275° C. Carbon monoxide was used as the purge fluid and the pressurizing fluid.

In the first step of the process, the feedstock was introduced into the reactor which was pre-saturated with one of the product gases, carbon monoxide, at 275° C. and 57 psig. The process was carried out under the above-mentioned conditions. For the first 70 minutes, the effluent stream consisted of CO only. FIG. 3 illustrates the CO concentration profile in reactor effluent versus time for the reverse water gas shift reaction. The hatched area of the diagram represents the carbon monoxide effluent from the reactor which is equivalent to the quantity of carbon monoxide present in the reactor at the start of the process. This amount of carbon monoxide left the reactor in the first 38 minutes of the operation. Furthermore, the diagram illustrates that essentially pure carbon monoxide was produced from the reactor during the time span between about 38 minutes and 78 minutes. This essentially pure carbon monoxide effluent, which requires minimal cleanup to remove the small amount of impurities in the effluent, was the net essentially pure carbon monoxide produced by the concept of the present invention. This product CO is produced at the feedstock pressure of 57 psig. FIG. 4 illustrates the reactor effluent flow rate versus time for the reverse water gas shift reaction of Example 1. The effluent flow rate was relatively constant during the period of 38 to 78 minutes when the carbon monoxide product is produced. The initial step may be carried on for varying amounts of time: the reaction step is preferably stopped after 71.7 minutes to provide a product stream containing 98% carbon monoxide or 78.3 minutes to obtain a product stream containing 97% carbon monoxide. In the second step the reactor was countercurrently depressurized to 10 psig to release a mixture of CO, $CO_2$, $H_2$ and $H_2O$. In the third step the bed was countercurrently purged with a weakly adsorbing purge fluid, methane, at 275° C., at a pressure of 10 psig and a flow rate of 1600 cc/min. in order to desorb the remaining water from the adsorbent-catalyst admixture. In the fourth step of the process, the reactor was countercurrently purged with carbon monoxide to desorb the weakly adsorbing purge fluid and other fluids remaining in the reactor. Finally, in the fifth step, the reactor was countercurrently pressurized to 57 psig with carbon monoxide.

The usable conversion of carbon dioxide to carbon monoxide was 60.6% for reactor effluent containing 98% carbon monoxide and 56.0% for reactor effluent containing 97% purity.

EXAMPLE 2 (Comparative)

Equilibrium Conversion Estimations for Conventional Reverse Water-Gas Shift Reaction for Producing Carbon Monoxide Equilibrium conversion was estimated based on thermodynamic data for a conventional water gas shift reaction at different reaction temperatures. The calculations show that at the reaction temperature of 275° C. according to Example 1, the equilibrium conversion in the absence of the adsorbent is only 11.0%. In order to achieve conversion of 60.6% according to Example 1, the reaction would need to be carried out at 1150° C. This points to the significant reduction in reaction temperature achieved in practicing the process of the present invention.

An additional major advantage of the present invention is that CO is obtained as an essentially pure product as in Example 1. In conventional reverse water gas shift reactions, operated at a temperature of 275° C., the product composition would be: 5.5% CO, 5.5% $H_2O$, 44.5% $H_2$ and 44.5% $CO_2$. For reactions at 1000° and 1150° C., the compositions are (i)28% CO, 28% $H_2O$, 22% $H_2$ and 22% $CO_2$ and (ii) 30.3% CO, 30.3% $H_2O$, 19.7% $H_2$ and 19.7% $CO_2$, respectively. Thus, the gas mixture would need to be separated by PSA/VSA technology, for example, to obtain a pure CO product.

Yet another major advantage of the present invention is that CO is obtained at feedstock pressure (eg. 57 psig in Example 1). With conventional PSA/VSA technology, the CO would be recovered at close to atmosphere pressure and would have to be recompressed for use.

EXAMPLE 3

Figure 5:
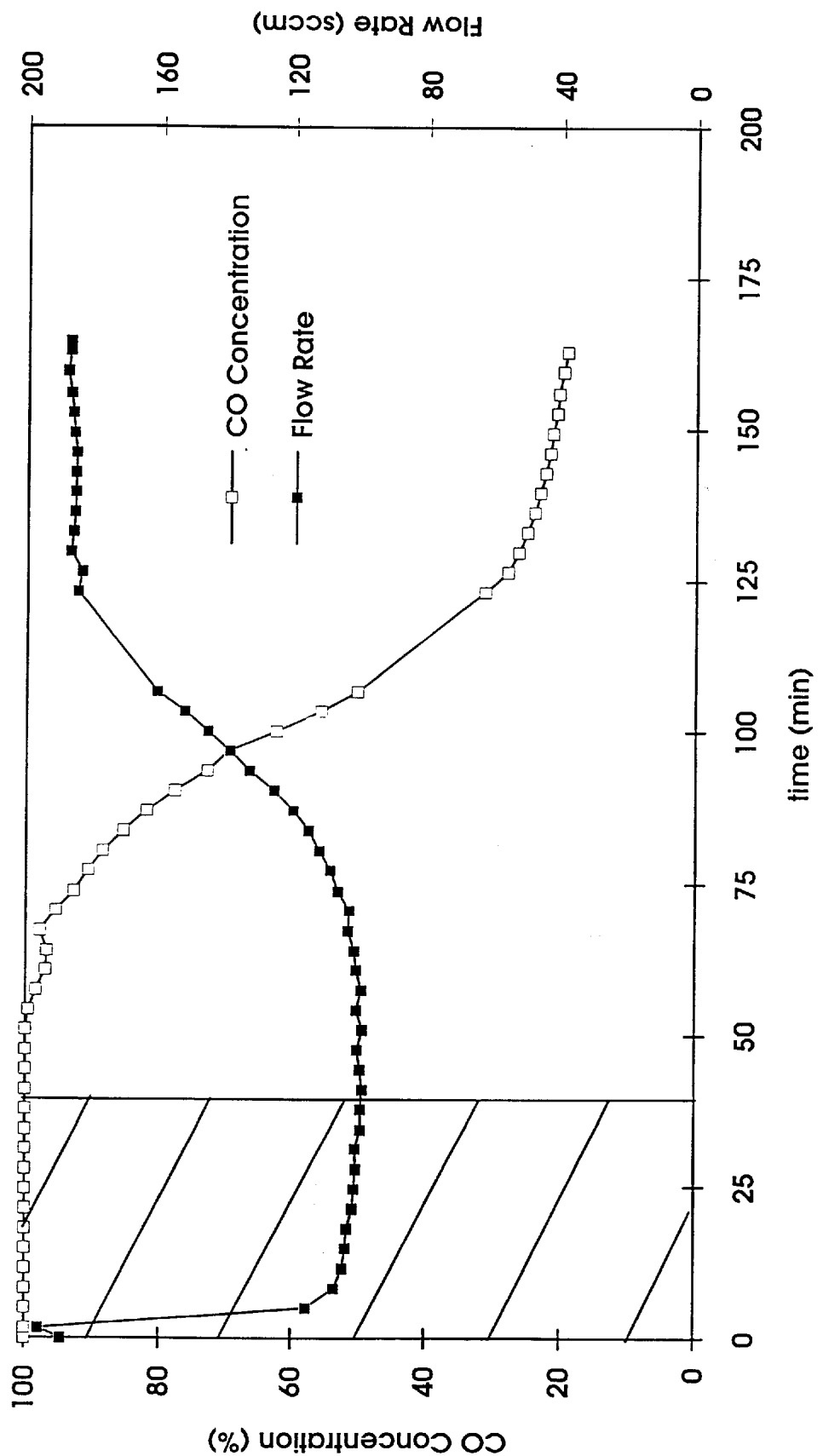
FIG. 5 illustrates the CO concentration profile and the flow rate of the reactor effluent for the reverse water gas shift reaction carried out according to the present process at 55 psig and 250° C. Carbon monoxide was used as the weakly adsorbing urge fluid and the pressurizing fluid.
Figure 6:
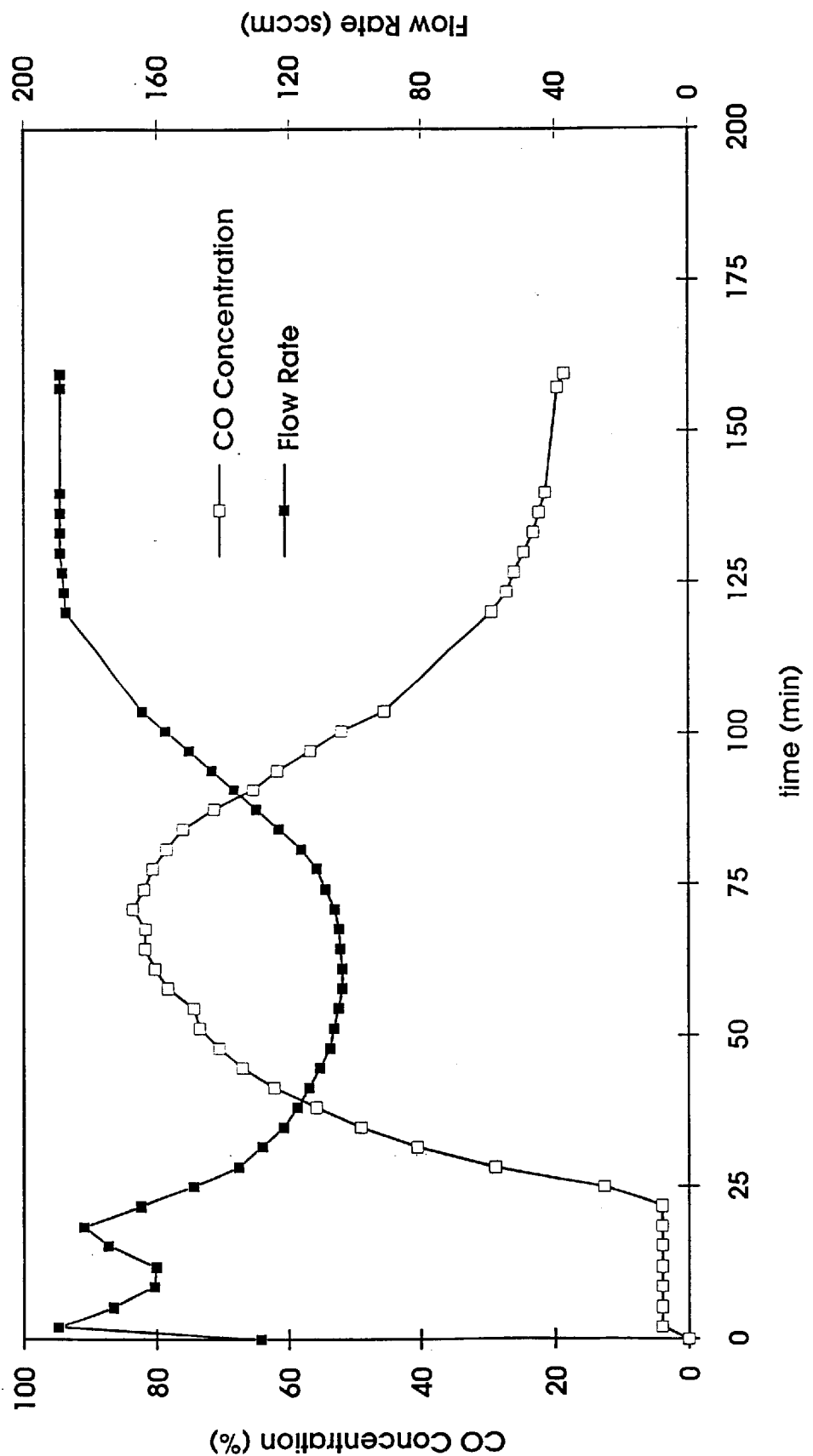
FIG. 6 illustrates the CO concentration profile and the flow rate of the reactor effluent for the reverse water gas shift reaction carried out according to the present process at 50 psig and 250° C. Carbon dioxide was used as the purge fluid and the pressurizing fluid.
Figure 7:
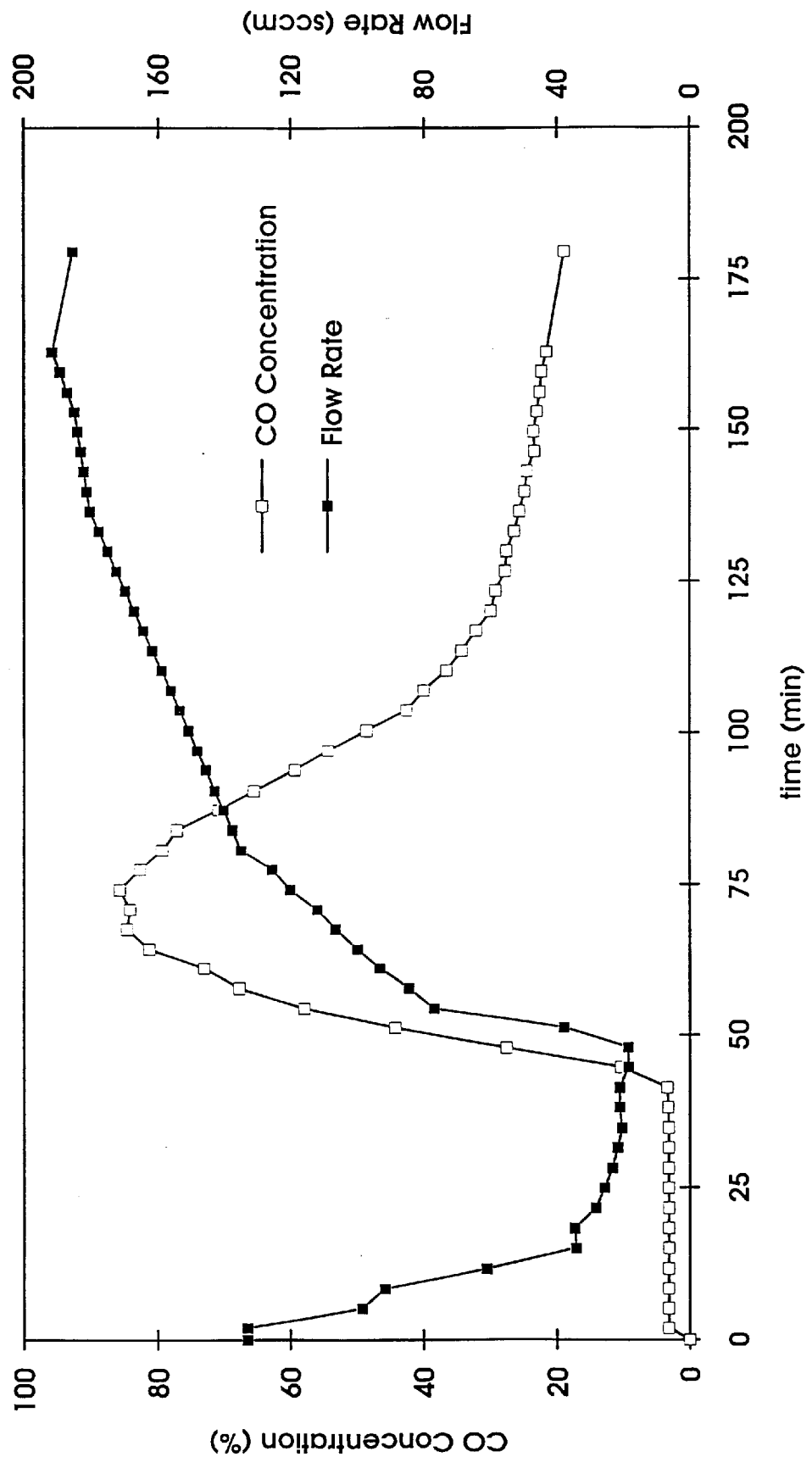
FIG. 7 illustrates the CO concentration profile and the flow rate of the reactor effluent for the reverse water gas shift reaction carried out at 50 psig and 250° C. Hydrogen was used as the purge fluid and the pressurizing fluid.

Effect of Pressurization Gas Type on Process Performance for Reverse Water-Gas Shift Reaction for Producing Carbon Monoxide This example demonstrates the effect of varying the type of fluid used in the fourth and fifth steps of Applicants' process described in Example 1 on reactor operation, conversion of $CO_2$ to CO and product purity. The experiments were carried out at the following conditions: Reaction Temperature=250° C.; Reaction Pressure=50 psig; $H_2$ flow rate=100 cc/min; $CO_2$ flow rate=100 cc/min; Catalyst and zeolite pellets employed in Example 1 were physically admixed (1:1 ratio by weight); Gas in reactor prior to admission of reactants=CO or $CO_2$ or $H_2$ at 50 psig. FIGS. 5, 6 and 7 illustrate the different results obtained when carbon monoxide, carbon dioxide, or hydrogen were used as the purge and pressurization fluids, respectively.

FIG. 5 illustrates the CO concentration profile and the flow rate of the reactor effluent for the reverse water gas shift reaction when the process is carried out using carbon monoxide as the purge fluid and pressurizing fluid according to the fourth and fifth steps of the process according to Example 1. Again, the hatched area of the diagram represents the carbon monoxide effluent from the reactor which is equivalent to the quantity of carbon monoxide present in the reactor at the start of the process. This amount of carbon monoxide left the reactor in just 38 minutes of the operation. FIG. 5 demonstrates that the claimed process provides a reactor effluent which comprises essentially pure carbon monoxide and that the carbon monoxide can be conveniently collected at a constant flowrate.

FIG. 6 illustrates the CO concentration profile and the flow rate of the reactor effluent for the reverse water gas shift reaction when the process is carried out using carbon dioxide as the purge fluid and pressurizing fluid according to the fourth and fifth steps of the process according to Example 1. In contrast to the results depicted in FIG. 5 when carbon monoxide was used as the purge fluid, FIG. 6 shows that the carbon monoxide concentration slowly rises, reaches a maximum and then decreases with practically no section of constant CO composition and flowrate when carbon dioxide was used as the purge fluid in the fourth and fifth steps of the process according to Example 1. Furthermore FIG. 6 shows that the CO composition of reactor effluent never exceeds 83% as opposed to essentially pure CO effluent obtained in FIG. 5 wherein carbon monoxide was used as the purge and pressurization fluid.

FIG. 7 illustrates the CO concentration profile and the flow rate of the reactor effluent for the reverse water gas shift reaction when the process is carried out using hydrogen as the purge fluid and pressurizing fluid according to the fourth and fifth steps of the process according to Example 1. In contrast to the results depicted in FIG. 5 when carbon monoxide was used as the purge fluid, FIG. 7 shows that the carbon monoxide concentration slowly rises, reaches a maximum and decreases with practically no section of constant CO component and flowrate when hydrogen was used as the purge fluid in the fourth and fifth steps of the process according to Example 1. Further, FIG. 7 shows that the CO composition of the effluent gas never exceeds 85% as opposed to essentially pure CO effluent of FIG. 5.

Several observations can be made upon reviewing the results depicted in FIGS. 5, 6 and 7. Pure CO in the product stream is surprisingly observed only in the case where carbon monoxide is used as the purge and pressure fluid of steps 4 and 5 of the general embodiment and steps 5 and 6 of the alternate embodiment. This result does not occur when carbon dioxide or hydrogen is used as the purge and pressurization fluid. As evidenced in FIGS. 6 and 7, a maximum carbon monoxide concentration of only about 80–85% is achieved when $H_2$ or $CO_2$ are employed as the purge fluid in the fourth and fifth steps of the process according to Example 1. Thus, if a high purity CO product is desired without further separation, the reactor must be pre-saturated with the less adsorbable product, carbon monoxide.

The Examples also demonstrate that the present invention for operating equilibrium controlled reactions overcomes problems associated with prior art processes wherein product flow rates do not remain constant and the desired products are present in unacceptably low concentrations in the reactor effluent while obtaining high conversion of the product at lower temperatures. Moreover, Applicants' unique series of steps for desorbing the more adsorbable product from the adsorbent residing in the reactor and for preparing the reactor for subsequent process cycles provides outstanding process efficiency and control.

Having thus described the present invention, what is now deemed appropriate for Letters Patent is set forth in the following Claims.

We claim:

1. A process for operating an equilibrium controlled reaction in a system utilizing a plurality of reactors operated isothermally and in a predetermined timed sequence, the process which comprises the following steps performed in a cycle with each reactor;
   (a) reacting a feedstock at a first pressure in a first reactor containing an admixture of an adsorbent and a catalyst suitable for conducting the equilibrium controlled reaction under reaction conditions sufficient to convert the feedstock into a more adsorbable product which is selectively adsorbed by the adsorbent and a less adsorbable product and withdrawing the less adsorbable product in substantially pure form under a relatively constant flow rate at the first pressure;
   (b) countercurrently depressurizing the first reactor to a second pressure by withdrawing a mixture comprising unreacted feedstock, a portion of the less adsorbable product and a portion of the more adsorbable product;
   (c) countercurrently purging the first reactor at the second pressure with a weakly adsorbing purge fluid with respect to the adsorbent wherein the weakly adsorbing purge fluid is a fluid other than the less adsorbable product to desorb the more adsorbable product from the adsorbent and withdrawing a mixture comprising unreacted feedstock, a portion of the more adsorbable product and a portion of the less adsorbable product;
   (d) countercurrently purging the first reactor at the second pressure with the less adsorbable product to desorb the weakly adsorbing purge fluid and withdrawing a mixture comprising the weakly adsorbing fluid, a portion of the more adsorbable product and a portion of the less adsorbable product; and
   (e) countercurrently pressurizing the first reactor from the second pressure to the first pressure with the less adsorbable product prior to commencing another process cycle within the first reactor.

2. The process of claim 1 further comprising:
   (f) separating the stream of step (a) which is enriched in the less adsorbable product and depleted in the more adsorbable product as well as unreacted feedstock to form a stream comprising the less adsorbable product.

3. The process of claim 1 further comprising:
   (f) separating the product mixture of step (c) comprising unreacted feedstock, a portion of the more adsorbable product and a portion of the less adsorbable product to form a stream comprising the more adsorbable product.

4. The process of claim 1 further comprising the following step which is conducted between step (a) and step (b): countercurrently purging the first reactor at the first pressure with a weakly adsorbing purge fluid and withdrawing a mixture comprising unreacted feedstock, a portion of the more adsorbable product and a portion of the less adsorbable product.

5. The process of claim 4 further comprising separating the mixture comprising unreacted feedstock, a portion of the more adsorbable product and a portion of the less adsorbable product to form a stream comprising unreacted feedstock and recycling a portion of the stream comprising unreacted feedstock for use as feedstock in step (a).

6. The process of claim I further comprising:
   (g) separating the mixture of step (d) comprising the weakly adsorbable purge fluid, a portion of the more adsorbable product and a portion of the less adsorbable product to form a stream comprising the weakly adsorbable purge fluid and recycling a portion of the stream for use as the weakly adsorbing purge fluid in step (c).

7. The process of claim 1 wherein the admixture of the adsorbent and the catalyst comprises from 5% to 95% by weight of the adsorbent and from 95% to 5% by weight of the catalyst.

8. The process of claim 1 wherein the feedstock comprises carbon dioxide and hydrogen, the more adsorbable product with respect to the adsorbent is water and the less adsorbable product is carbon monoxide.

9. The process of claim 8 wherein the reaction catalyst comprises a water gas shift catalyst and the reaction conditions comprise a temperature ranging from 200° to 600° C., the first pressure which ranges from 2 to 50 bar and the second pressure which ranges from 1 bar to 2 bar.

10. The process of claim 9 wherein the adsorbent comprises a zeolite or alumina and the weakly adsorbing purge fluid is selected from the group consisting of methane, hydrogen, nitrogen, and carbon dioxide.

11. The process of claim 1 wherein the feedstock comprises water and methane in a stoichiometric ratio of water to methane ranging from 1.5 to 30, the more adsorbable product with respect to the adsorbent is carbon dioxide and the less adsorbable product is hydrogen.

12. The process of claim 11 wherein the reaction catalyst comprises a steam-methane reforming catalyst and the reaction conditions comprise a temperature ranging from 200° to 700° C., the first pressure which ranges from 2 to 50 bar and the second pressure which ranges from 1 bar to 2 bar.

13. The process of claim 11 wherein the adsorbent comprises a metal oxide and the weakly adsorbing fluid is selected from the group consisting of methane, steam, hydrogen, nitrogen and carbon monoxide.

14. The process of claim 1 wherein the feedstock comprises methane and water in a stoichiometric ratio of water to methane ranging from 1 to 1.5, the more adsorbable product with respect to the adsorbent is carbon monoxide and the less adsorbable product is hydrogen.

15. The process of claim 14 wherein the reaction catalyst comprises a steam-methane reforming catalyst and the reaction conditions comprise a temperature ranging from 200° C. to 700° C., the first pressure which ranges from 2 to 50 bar and the second pressure which ranges from 1 bar to 2 bar.

16. The process of claim 15 wherein the adsorbent comprises a monovalent silver or copper compound which is supported on a substrate and the weakly adsorbing fluid is selected from the group consisting of methane, water, hydrogen, nitrogen and carbon dioxide.

17. The process of claim 1 wherein the feedstock comprises carbon dioxide and methane, the catalyst comprises a methane reforming catalyst, the more adsorbable product with respect to the adsorbent is hydrogen and the less adsorbable product is carbon monoxide.

18. The process of claim 17 wherein the reaction conditions comprise a temperature ranging from 200° to 700° C., the first pressure which ranges from 2 to 50 bar and the second pressure which ranges from 1 to 2 bar.

19. The process of claim 18 wherein the adsorbent comprises a hydrogen complexing metal alloy and the weakly adsorbing fluid is selected from the group consisting of methane, steam, carbon dioxide, carbon monoxide and nitrogen.

20. The process of claim 1 wherein the feedstock comprises carbon dioxide and methane, the catalyst comprises a methane reforming catalyst, the more adsorbable product with respect to the adsorbent is carbon monoxide and the less adsorbable product is hydrogen.

21. The process of claim 20 wherein the reaction conditions comprise a temperature ranging from 200° to 700° C., the first pressure which ranges from 2 to 50 bar and the second pressure which ranges from 1 to 2 bar.

22. The process of claim 21 wherein the adsorbent comprises a Cu+ or Ag+ salt and the weakly adsorbing fluid is selected from the group consisting of hydrogen, nitrogen, methane and, carbon dioxide.

* * * * *